United States Patent
Harley

(10) Patent No.: US 7,234,208 B2
(45) Date of Patent: Jun. 26, 2007

(54) DEVICE FOR PREVENTING CABLE DAMAGE DURING INSTALLATION

(75) Inventor: Ian Harley, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 10/484,750

(22) PCT Filed: Jul. 25, 2002

(86) PCT No.: PCT/GB02/03418

§ 371 (c)(1),
(2), (4) Date: Jan. 23, 2004

(87) PCT Pub. No.: WO03/012948

PCT Pub. Date: Feb. 13, 2003

(65) Prior Publication Data

US 2004/0218969 A1    Nov. 4, 2004

(30) Foreign Application Priority Data

Aug. 2, 2001    (GB)    .................... 0118861.4

(51) Int. Cl.
*A44B 21/00*    (2006.01)
*H02G 1/08*    (2006.01)

(52) U.S. Cl. ........................................... 24/303
(58) Field of Classification Search .............. 24/303; 403/DIG. 1, 300; 63/900
See application file for complete search history.

(56) References Cited

U.S. PATENT DOCUMENTS

| | | | | |
|---|---|---|---|---|
| 2,623,256 A * | 12/1952 | Feibelman | ................... | 24/303 |
| 2,772,902 A * | 12/1956 | LInd | ........................ | 403/165 |
| 2,975,497 A * | 3/1961 | Frances | ...................... | 24/303 |
| 3,041,697 A * | 7/1962 | Frances | ...................... | 24/303 |
| 3,129,477 A * | 4/1964 | Mitsuo | ........................ | 24/303 |
| 3,192,747 A * | 7/1965 | Stupell et al. | ............ | 70/456 R |
| 3,277,681 A * | 10/1966 | Bey | ............................ | 70/457 |
| 5,050,276 A * | 9/1991 | Pemberton | .................... | 24/303 |
| 5,197,168 A * | 3/1993 | Levy | .......................... | 24/303 |
| 5,311,647 A * | 5/1994 | Levy | .......................... | 24/303 |
| 5,317,789 A * | 6/1994 | Levy | .......................... | 24/303 |
| 5,367,891 A * | 11/1994 | Furuyama | ................... | 63/29.2 |
| 6,640,398 B2 * | 11/2003 | Hoffman | ...................... | 24/303 |

* cited by examiner

*Primary Examiner*—Robert J. Sandy
(74) *Attorney, Agent, or Firm*—Dillon & Yudell LLP

(57) ABSTRACT

A device to prevent cables from becoming damaged during the installation process is disclosed. The tolerances that a particular cable can withstand will typically vary dependent upon the type of cable and the number of cables pulled together. A magnetic linkage is therefore disposed between the cable and a pulling rope or cable and is adapted to break when a force appropriate to the particular installation scenario is applied (i.e. a force within the tolerance level specified by the manufacturer).

10 Claims, 1 Drawing Sheet

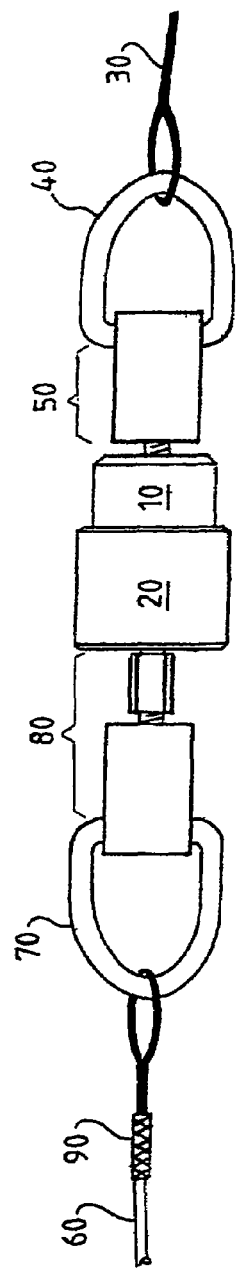
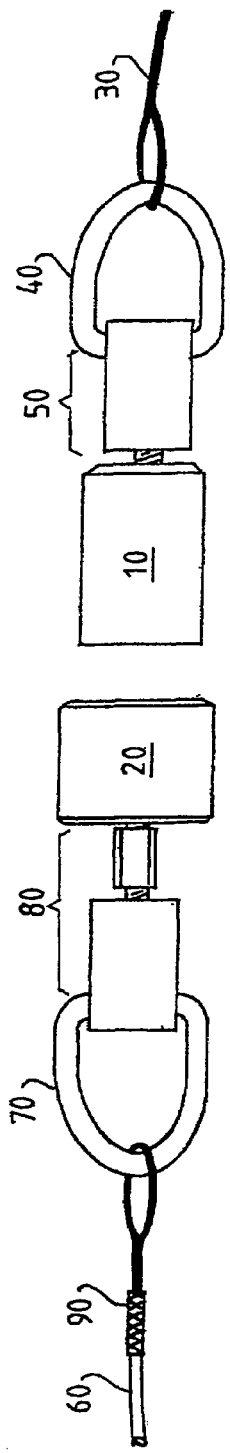
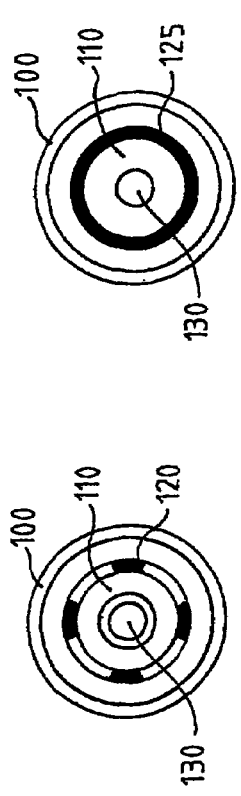
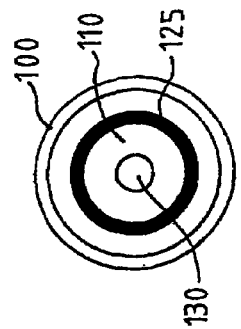

DEVICE FOR PREVENTING CABLE DAMAGE DURING INSTALLATION

This national phase application claims priority to an application entitled "A Device for Preventing Cable Damage During Installation" filed in The Patent Office of Great Britain on Aug. 2, 2001, and assigned Ser. No. 0118861.4, the contents of which are hereby incorporated by reference.

The present invention relates to the installation of cabling, and more specifically to a device for preventing cable damage during installation.

Twisted pair copper cabling has traditionally been used to carry voice and data to end-users and typically hundreds of metres of cabling has to be run above ceiling or underground to reach those users. Potential damage to the cables during the installation process is a big problem since if too great a force is exerted on these cables then the twisted pair conductors inside the cabling insulating sheath are over stretched. Consequently the distance between the twisted pairs will be reduced giving rise to an increase in cross-talk and reducing the effectiveness of the cables. Further one or more of the conductors may even break.

Installers typically pull these cables in from 500 m drums. If for example offices require four voice/data connection points, then installers will in all likelihood pull from four drums at a time. Thus they are in fact attempting to pull 2 km of cable from a standing start. This is where damage is likely to occur.

The onset of Cat 6/7 standards has placed demands on manufacturers for even greater performance and bandwidth. Cabling such Shielded Foiled Twisted Pair (SFTP) has been developed to meet these increased demands. With such cabling, each twisted pair conductor is surrounded by a layer of aluminium foil. All the pairs are then covered by a further layer of foil and then a braided shield of wires. This new configuration permits an information transfer rate of approximately 200 Gigabytes per second as opposed to the 100 Megabytes per second provided by the basic twisted pair cabling. However such a transfer rate is even more highly dependent upon the precise positioning of the twisted pair conductors within the cabling sheath.

Such copper cables typically cannot retain their configuration if stressed (pulled) beyond 50 N (5 Kg). The cable manufacturers clearly define the tolerances that their products can withstand and these are typically:

1×4 pair cable pulled in by hand=50 N (5 Kg)
2×4 pair cables pulled in by hand=75 N
3×4 pairs cables pulled in by hand=100 N
X×4 pair cables pulled in by hand=X×25+25 N (up to a maximum of 200 N)

Installing such cabling can prove extremely time consuming. Since it will not be visibly obvious that a cable has been over stressed, an installer will typically complete an installation and only discover that the cable has become damaged when performing tests subsequently. They will then have to start the process all over again, having wasted many hours. The damaged cabling will also have to be replaced and this can prove costly. Sophisticated cabling such as SFTP currently retails at approximately £185 a reel.

The installation process has proved problematic for many years and not just with the copper cabling. When fibre cables first started to appear, this issue was resolved by the introduction of pulling fuses such as the type manufactured by Condux International, Inc. Such a device is attached between the cable being pulled and a pulling rope or cable. It typically consists of two barrels linked together by an internal metal break pin. The metal pin is precisely manufactured to break when the desired amount of stress or tension is exerted on the cable being pulled, thus preventing internal damage to the cable. Different metal pins are available dependent upon the break point required.

Unfortunately it is not possible to use such devices effectively when installing fragile SFTP copper cabling. Fibre optic cabling is far stronger, and so all these devices are made up of physical barrels which will typically snap in half at between 667 and 8,006 N. This is far too high a figure for the copper cable application and it is currently not possible to manufacture metal pins which break under the much reduced amount of strain required. This is because the thinner the metal pin is made, the more difficult it becomes to control the break point.

Accordingly, the invention provides a magnetic linkage for cable installation, the linkage comprising: two components, which in operation are held together by magnetic attraction, one of the components being adapted to attach, via first attachment means, to the cable and the other component being adapted to attach, via second attachment means, to a pulling rope, the components further being adapted to break apart when a predetermined pulling force is applied.

As stated above, the type of cables to which the invention is particularly applicable can be extremely fragile because the precise positioning of the conductors within the cabling sheath is typically important. If the cables are over stretched (i.e. the predetermined force is exceeded), then the cables are likely to become damaged. The linkage or cable pull of the present invention decouples when the predetermined force is applied and breaks the pulling tension. The cable installer is warned by the sudden reduction in the pulling tension that they were dangerously close to damaging the cable, but no actual damage is done. The installer is able to quickly and easily reset the linkage and continue with the installation. Such a linkage saves time because previously only subsequent installation tests would determine that there was a problem with the cable. (The damage is typically not visible but is contained within the cabling sheath.) Further such cables are expensive and this linkage therefore represents a huge cost saving by breaking before the cables are themselves damaged.

In a preferred embodiment the first component comprises a magnetic portion and the second component comprises a magnetically attractable portion. The magnetic portion comprises a permanent magnet having a strength that will remain constant over the lifetime of the linkage (unless it is recalibrated). The magnetically attractable portion comprises a material which is attracted by the magnet (e.g. a ferrous material such as iron). It will of course be appreciated that alternatively two components each with magnetic portions could be used.

In a preferred embodiment the magnetically attractable portion of the second component has a controlled contact area with the magnetic portion of the first component. This contact area is used to control the amount of force required to break the magnetic linkage. It will be appreciated that it is also possible for the force required to break the linkage to be set by controlling the strength of the magnetic portion of the first component (or by a combination of both methods). However, it is easier in practice to machine the magnetically attractable portion of the first component so that a particular configuration of the contact area determines the load under which the two components decouple. The calibration provided is in this way much more precise. One convenient way is to configure the surface profile of the magnetically attractable portion of the second component to provide the controlled contact area with the magnetic portion of the first component. It is also possible to machine the magnetic portion to control the contact area with the magnetically attractable portion but this is not as straightforward a method because the magnet may be less easy to machine, and changes in the shape of the magnet affect both the contact area and field strength.

In a preferred embodiment the first component has a male connector which is inserted into a female connector on the second component to provide the linkage (although the male and female components could of course be reversed). The female connector is preferably a sheath of circular cross-section which makes insertion of the male connector easier by avoiding the need for any rotational alignment when forming the linkage. However a wide variety of other shapes and configurations could also be used.

The male connector is preferably sized to fit snugly inside the female connector. It will be appreciated that without this snug fit, it would be possible for the two components to get separated from one another during the installation process by a bending force that would tend to snap the linkage sideways, rather than pulling it apart. The sheath therefore holds the components in position regardless of any sideways forces exerted on the linkage. This ensures that the linkage is only broken by a force exerted in a direction parallel to the direction in which the cable is being pulled. The flush fit between the first and second components also makes it possible to reproduce the position in which the two components couple to one another. This in turn ensures that a consistent breaking force is required to separate the linkage.

In a preferred embodiment, the interior of the female connector has a rim and in use the male connector is inserted into the female connector until it abuts that rim. This precise positioning again helps to ensure a consistent linkage force. The rim has a contact area which is controlled in accordance with the desired predetermined force. The more material that makes contact with the magnetic portion of the first component the greater the force that is required to break the linkage. In one embodiment the rim comprises a plurality of crenellations, which provide a convenient way of controlling the contact area by adjusting the spacing of the crenellations.

Preferably, the first and/or second attachment means each include a swivel piece. This allows for rotation of the linkage relative to the cable axis during the pulling process, thereby preventing the cable from becoming twisted during installation. Preferably the first and/or second attachment means includes a pivotable loop onto which the cable or pulling rope (as appropriate) can be fastened. This provides flexibility and reduces the risk of bending damage to the cable.

It will be appreciated that the tolerances that a particular cable can withstand will typically vary dependent upon the type of cable and the number of cables pulled together. Examples of these tolerances have been given in the background section. Therefore one of the two components of the magnetic linkage preferably includes a detachable sub-component to allow replacement by another sub-component that provides a magnetic attraction of different strength between the two components.

In one preferred embodiment, the magnetic linkage is supplied with a set of sub-components that are interchangeable into the linkage. Each sub-component is calibrated to provide a different predetermined breaking force. For example, the linkage can be supplied with a kit of three different sub-components, one for each of the cabling loads mentioned in the background section. Thus by way of example, there is one sub-component where the predetermined force is 50 N; one for 75 N and one for 100 N (note, the predetermined force is preferably not more than 200 N). It will be appreciated that the invention is not limited to these precise specifications and that any number of sub-components are possible. Because one sub-component may be substituted for another, it is possible for the linkage to be used in differing installation scenarios and also to keep pace with new developments in the cabling industry. For example, if a new and more fragile cable becomes available it will be possible to manufacture a sub-component which will decouple from the second component under a suitably low strain.

A preferred embodiment of the present invention will now be described, by way of example only, and with reference to the following drawings:

FIGS. 1 and 2 show the device of the present invention at two stages of operation in accordance with a preferred embodiment; and FIGS. 3*a* and 3*b* show the interior of the magnetically attractable component of the present invention in accordance with two preferred embodiments.

As shown in FIG. 1, a device has been designed having two principal components: an open-ended steel barrel housing a magnet (magnetic component 10); and a magnetically attractable component 20. In use the two components are held together by the magnetic force of the magnetic component. The magnetic component is attachable to a rope used for pulling 30 the cable, which is being installed, via a swivel piece 50 and a loop 40. The magnetically attractable component is attachable to the cable itself 60 via swivel piece 80 and a loop 70. Typically the cable is placed inside a metal grip 90 which tightens around the cable to hold it securely in place. It is the metal grip which is actually attached to loop 70. The swivel pieces are incorporated to allow for movement of the cable during the pulling process, thereby preventing it from becoming twisted during installation.

The magnetically attractable component has been precisely machined such that placing the two principal components under a desired amount of strain during installation will cause them to separate, thereby releasing the tension on the cable before it becomes over stressed and damaged (see FIG. 2). When the two components part, the tension is broken making the installers quickly aware that they were exerting too great a force on the cable.

Unlike the pulling fuses of the prior art it is possible to ensure that the magnetic force holding the two components together is broken under the comparatively low pulling loads listed in the background section. The device is not dependent upon consumables such as replacement broken metal pins and has few moving parts which are likely to require substitution. It is consequently extremely robust. The device therefore typically represents a one off cost to the installer. Further, the loops and swivel pieces are preferably made out of a lightweight material such as aluminium and the two principle components are also relatively lightweight. It is therefore possible to manufacture such a device weighing under 200 grammes in total. This is advantageous because it means that it cannot damage the cables when it operates (i.e. if it falls on the cables when the magnetic contact is broken).

FIGS. 3*a* and 3*b* show the machined interior of two magnetically attractable components, each one designed to decouple from the magnetic component when placed under a different level of stress. The magnetically attractable component has an outer casing or sheath 100 which houses a smaller barrel 110 with a rim 120, 125. The amount and thickness of the material making up the rim is precisely manufactured to determine the force under which the magnetic component and the magnetically attractable component will separate. The more material that makes contact with the magnetic component the greater the force that will be required. In FIG. 3a the rim 120 has a crenelated profile (the crenellations being shaded and the gaps between the crenellations shown in white). FIG. 3b shows a complete rim 125 with no gaps and thus requires a greater force in operation before the two components will decouple than the magnetically attractable component shown in FIG. 3a. This is because in FIG. 3b the surface area of the rim which actually makes contact with the magnetic component is greater than in FIG. 3a. Thus the thickness of the rim also is a determining factor.

Apart from precise machining, it is preferable to ensure that the magnetic component makes a flush fit with the rim of the magnetically attractable component. This is made possible by the outer casing which enables the reproduction of the position in which the two components couple to one another. This in turn ensures that a consistent breaking force is required to separate the magnetic linkage. Further, it will be appreciated that without snug fit possible due to the casing surrounding the interior barrel of the magnetically attractable component, the two components could get separated from one another during the installation process by a bending force that would tend to snap the magnetic linkage sideways, rather than pulling it apart. The casing therefore holds the components in position regardless of any sideways forces exerted on the linkage. This ensures that the linkage is only broken by a force exerted in a direction parallel to the direction in which the cable is being pulled. Of course if the magnetic coupling is broken under a load lighter than is desirable, it is not damaging to the cable but is frustrating for the installers who continually have to reset the device.

It should also be noted that the surface of the magnetic component which makes contact with the magnetically attractable component should be as free from contamination as is possible. This is because any contaminants are also likely to cause the two components to break contact with one another earlier than is desirable.

Preferably the device is stored as is shown in FIG. 1 with the two components in contact with one another. This should prevent contamination of the magnetic component. However, should the component become contaminated then the surface of the magnetic component which makes contact with the magnetically attractable component can simply be wiped clean.

A further advantages of the preferred embodiment is that the swivel pieces of the device 50, 80 allow their respective component to move with the pulling rope/cable. Moreover, the coupling device very compact and is unlikely to catch on anything during the installation process.

To allow the device to be used with different magnetically attractable components and thereby be resistant to different amounts of strain, the magnetically attractable component has an aperture 130 for receiving a threaded screw of swivel piece 80. It is therefore possible to unscrew one magnetically attractable component and replace it with another. In one embodiment the device is supplied with a kit of three different magnetically attractable components. There is one magnetically attractable component for each of the cabling loads mentioned in the background section. It will be appreciated that the invention is not limited to such and that any number of magnetically attractable components are possible. Because one magnetically attractable component may be substituted for another, it is possible for the device to be used in differing installation scenarios and also to keep pace with new developments in the cabling industry. For example, if a new and more fragile cable becomes available it will be possible to manufacture a magnetically attractable component which will part company with a magnetic component under a suitably low strain.

It will be appreciated that whilst the invention has been described primarily in terms of interchangeable magnetically attractable components, it would be possible for the device to use interchangeable magnetic components. With such an alternative design, the strength of the magnetic component is precisely controlled to set the force required to separate the two components. However, it is easier to machine the magnetically attractable component such that a particular configuration of the area which makes contact with the magnetic component controls the load under which the two components separate. The control provided is in this way more precise.

Further whilst the invention has been described in terms of its applicability to SFTP copper cabling, it will be appreciated that the invention is applicable to any type of cabling. As has been described, it is however particularly suitable for protecting fragile cabling since it is possible to cause the magnetic component and the magnetically attractable component to separate from one another under a much lower strain than the prior art devices.

The invention claimed is:

1. An apparatus for preventing damage to a cable when said cable is being pulled during cable installation, said apparatus comprising:
a first component having a magnetic element is capable of being coupled to a pulling means; and
a second component having a magnetic attractable element is capable of being coupled to said cable, wherein said magnetically attractable element includes a controlled contact area for contacting with said magnetic element, and includes a crenelated rim to provide lesser surface area for contact with said magnetic element, wherein said first and second component are being held together by magnetic attraction during operation, wherein said first component is capable of completely breaking away from said second component when a pulling force applied to said pulling means exceeds a predetermined pulling force such that said cable cannot be pulled by any additional pulling force applied to said pulling means.

2. The apparatus of claim 1, wherein the size of a surface area of said controller contract area is proportional to said predetermined pulling force.

3. The apparatus of claim 1, wherein said magnetically attractable element includes an outer casing to ensure said magnetically attractable element make a flush fit with said magnetic element.

4. The apparatus of claim 3, wherein said outer casing protects said magnetically attractable element from breaking away from said magnetic element by any force exerted in a direction not parallel to a direction in which said cable is being pulled.

5. The apparatus of claim 1, wherein the size of a surface area of said rim is proportional to said predetermined pulling force.

6. The apparatus of claim 1, wherein said first component includes a swivel piece.

7. The apparatus of claim 6, wherein said first component includes a pivotable loop capable of coupling said swivel piece to said pulling means.

8. The apparatus of claim 1, wherein said second component includes a swivel piece.

9. The apparatus of claim 8, wherein said second component includes a pivotable loop capable of coupling said swivel means to said cable.

10. An apparatus for preventing damage to a cable when said cable is being pulled during cable installation, said apparatus comprising:

a first component capable of being coupled to a pulling means;

a second component capable of being coupled to said cable, wherein said first and second component are being held together by magnetic attraction during operation, wherein said first component is capable of completely breaking away from said second component when a pulling force applied to said pulling means exceeds a predetermined pulling force such that said cable cannot be pulled by any additional pulling force applied to said pulling means; and at least two detachable subcomponents;

wherein one of said first and second components includes one of said detachable sub-components to allow replacement by another of said detachable subcomponents that results in a magnetic attraction of different strength between said first and second components.

* * * * *